Feb. 24, 1931.                G. F. TAYLOR                 1,793,529
            PROCESS AND APPARATUS FOR MAKING FILAMENTS
                Filed Jan. 4, 1928        2 Sheets-Sheet 2
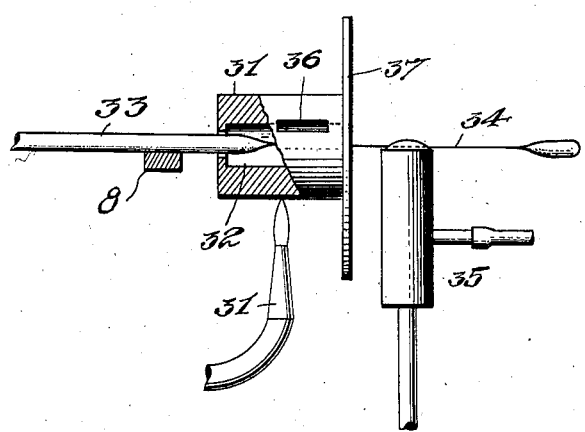
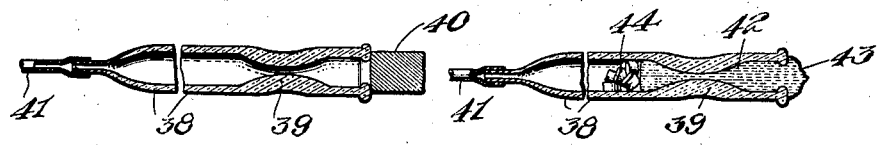
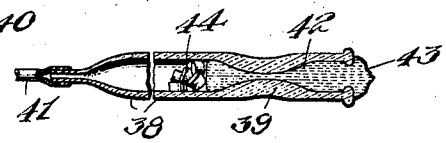
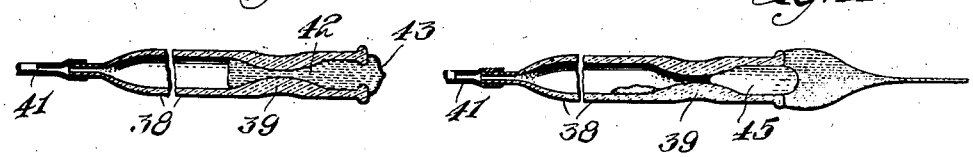
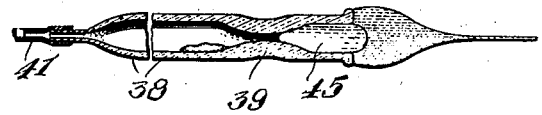
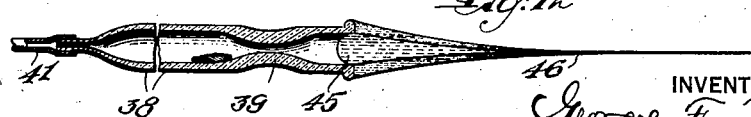
INVENTOR,
George F. Taylor,
BY Everett Rook,
ATTORNEYS.

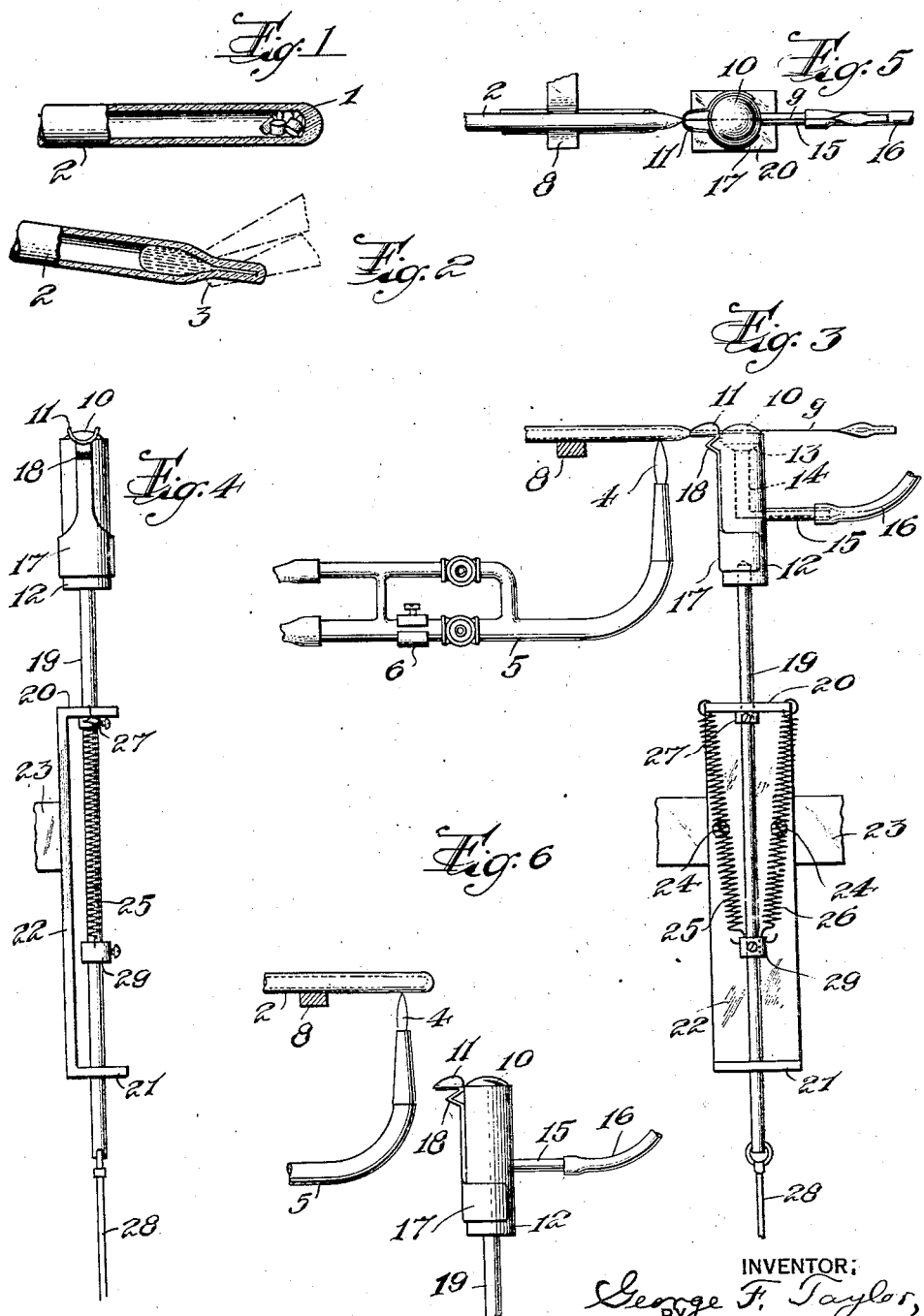

Patented Feb. 24, 1931

1,793,529

UNITED STATES PATENT OFFICE

GEORGE F. TAYLOR, OF SCHENECTADY, NEW YORK, ASSIGNOR TO BAKER & CO. INC., A CORPORATION OF NEW JERSEY

PROCESS AND APPARATUS FOR MAKING FILAMENTS

Application filed January 4, 1928. Serial No. 244,472.

This invention relates to the production of filaments from substances lacking sufficient ductility to be drawn in the usual way, but which can be drawn in an envelope, such as of glass or quartz. Such filaments are used in resistance thermometers, thermocouples, galvanometer suspensions, as hair lines for the eye-pieces of telescopes, in micropiles, bolometers, moving coils of galvanometers, and so forth.

The objects of the invention are to provide improved processes and methods for drawing such filaments, and suitable apparatus for carrying them out; to secure lengths of filament without breakage from contraction or expansion; to enable such filaments to be drawn from substances with boiling points too low for envelopes of glass or quartz, and to obtain other advantages and results as may be brought out in the following description.

Referring to the accompanying drawings, in which like numerals of reference indicate the same parts throughout the several views, Figure 1 is a longitudinal sectional view of a glass tube in which a substance is about to be melted for drawing;

Figure 2 is a similar view after the substance has been melted and a pure portion of it separated from the slag;

Figure 3 is a front elevation of an apparatus by which the drawing is shown as carried out;

Figure 4 is a side view of the same;

Figure 5 is a plan of the same;

Figure 6 is a front elevation of the apparatus during the preliminary heating of the substance to be drawn;

Figure 7 is a view similar to Figure 3 of a modified heating apparatus;

Figure 8 is a longitudinal sectional view of a glass tube to which borax is being applied for drawing a substance with an envelope of borax;

Figure 9 is a similar view with the borax extending into the tube;

Figure 10 is a similar view showing the substance introduced for melting in order to be drawn;

Figure 11 shows the melted substance entering the borax to be drawn therewith, and Figure 12 shows the drawing taking place.

In carrying out my improvements, with a substance whose melting and boiling points are such that a glass tube will soften at a temperature between them so that it can be drawn, a small portion 1 of the substance is placed in the closed end of such a tube 2 and heated, as by a flame 4, until both the substance and the enclosing glass become soft. Then the end portion of the tube is pinched, as by forceps 3 shown in Figure 2, to cause a clean portion of the substance to flow back from said end of the tube and leave the impurities in said pinched end. Whereupon, the glass containing the clean molten substance being heated until it will draw, it is drawn into a fine compound filament, as shown in Figures 3 and 5, consisting of an envelope of glass and a core of the substance. Any suitable flame can be employed, but for purposes of illustration I have shown an ordinary oxyhydrogen burner 5, held by a clamp 6.

I have shown a substantially horizontal rest 8 to conveniently support the tube 2 in proper relation to the flame 4, and at the opposite side of the flame is a device for chilling or solidfying the glass-coated filament 9 as it is drawn out, said device being shown as providing a small body or globule of water 10 through which said filament passes as it is drawn. In this way the core of the filament is solidified so that its continuity will not be destroyed by contraction or its envelope ruptured by expansion, even though drawn rapidly. A guard 11 protects the filament from too much heat from the flame 4, said guard preferably extending to the point at which said filament begins to be formed, as shown.

The chilling or solidifying device may be of any suitable construction, but I have shown it consisting of an upright cylinder 12 of metal or other heat-resisting material providing at its top a cup 13 for the water 10, which is supplied through a duct 14 extending downwardly and laterally through the cylinder 12 to a projecting pipe 15 which receives a flexible tube 16 leading to a suitably constant source of supply (not shown) adapted to keep the cup 13 always full. This causes the glass-enclosed filament to solidify while it is close enough to the still liquid portion of the substance so that said liquid portion will flow to supply any deficiency from contraction of the core and so prevent breakage or parting.

The guard 11 is preferably mounted upon the cylinder 12 so that it can be adjusted longitudinally or rotatably thereon, as by the spring clip 17 having the neck 18.

In operation, the portion 1 of the substance is melted in the closed end of the glass tube as shown in Figure 1, and the pure part run a little further up the tube by pinching its extreme end as in Figure 2, leaving the slag in said end thus flattened, which can be drawn off and discarded, if desired. The tube being properly heated where the pure part of the substance is, can then be drawn out to a very small diameter and will contain a core of the substance.

It will be understood that the heating up to the time the real drawing begins, is preferably done with the chilling or solidifying device out of the way, and therefore the cylinder 12 of said chilling device is mounted so that it can be lowered, as illustrated in Figure 6, when desired. Any suitable means for doing this can be employed, but I have shown the cylinder 12 upon the upper end of a rod 19 slidable in the arms 20, 21 of a bracket 22 which can be fastened to a suitable support 23 such as the edge of a bench, as by screws 24. Springs 25, 26 normally hold the cylinder 12 in its uppermost position, determined by a stop 27 on the rod 19 engaging the upper arm 20 of the bracket 22, and a cord 28 or other suitable connection extending from the lower end of the rod 19 to a treadle or the like (not shown) enables the cylinder to be held depressed with a lower stop 29 on its supporting rod engaging the lower arm 21 of the bracket.

Instead of the bare flame 4, it is better to use, as shown in Figure 7, a heater consisting of a cylinder 30 of metal, such as nickel for more fusible substances and tungsten for more refractory ones, with suitable heating means, such as a burner 31, and having an interior axial chamber 32 through which the tube 33 and filament 34 extend, with the rest 8 and chilling or solidifying device 35 as heretofore described at opposite ends thereof. A slit 36 through the side of the cylinder 30 and opening into its chamber 32 enables the operator to watch the drawing of the filament, and a shield 37, shown as a disk of metal or the like, at the end of the cylinder next the heat-controlling device 35, protects the latter from undue heat. This heater gives a more even and distributed heat than a flame, and correspondingly better and more nearly perfect results.

With substances of different melting points I use different kinds of glass having different melting points, so that there shall not be too much difference between the temperatures at which the substance and the glass will draw. For substances with very high melting points I use quartz tubes, and for substances which draw at very low temperatures I employ borax in the following manner. A glass tube 38 with a circumferential interior constriction 39 near its end has a stick 40 of borax pressed against its end, as in Figure 8, and both are heated; a rubber tube 41 connects the other end of the glass tube to a source of suction, such as the operator's mouth, and as the borax softens suitably sufficient suction is exerted to cause it to pass into the glass tube to a point at or slightly beyond the constriction 39, as shown at 42 in Figure 9, when the main portion of the borax stick may be drawn off as at 43.

With this arrangement of borax in the glass tube, pieces 44 of the substance to be drawn into wire or filament are dropped into the tube, next to the borax, as shown in Figure 10, and melted by the application of heat with the apparatus hereinbefore described. Then by pressure through the rubber tube 41 a pure portion 45 of the melted substance is forced past the constriction 39 of the glass tube, centrally into the fused borax, as shown in Figure 11, and by drawing out the borax and its core thus formed a fine filament 46 of borax with a core of the substance can be obtained, as shown in Figure 12. This drawing is preferably done with the same apparatus as shown in Figures 3–7, inclusive, and with the chilling or solidifying shown therein.

Filaments made by my processes herein described can be used with the coating of glass, borax or the like upon it, if desired, as for insulation, or if the bare core is desired the coating can be dissolved away. Thus, glass coatings can be removed by hydrofluoric acid, and borax by water or very dilute hydrofluoric acid, leaving a bright clean filament of the substance forming the core. One result of the borax process is that by it filaments can be drawn of substances which are soluble in hydrofluoric acid, such as cadmium, zinc and their alloys, since only water need be used to remove the borax coating or envelope. Another result is that the filaments, being drawn in glass or quartz, are not subject to contamination and are therefore of exceptionally high purity.

It will be understood that my invention in practice is used for substances which lack ductility to such an extent that they cannot well be drawn by other known methods. For those which become liquid, without boiling, at a low temperature, say 400° C. to 600° C., such as bismuth, thallium or tellurium, borax is used, and the proper viscosity of borax can be extended somewhat for substances of higher melting points, such as antimony, by the addition of silica to the borax. For substances with still higher melting points, such as germanium, manganin and silver, increasingly hard glasses are used, until the use of quartz is reached, as for platinum and rhodium.

Various modifications of details may be made by those skilled in the art, in carrying out my process and constructing the apparatus therefor, and I do not wish to be understood as limiting myself except as required by the following claims when construed in the light of the prior art.

Having thus described the invention, what I claim is:

1. The process of drawing a molten substance into fine filament as the core of a borax envelope.

2. The process of drawing a molten substance into fine filament as the core of a borax envelope, and dissolving away said envelope.

3. The process of embedding a molten substance in borax under heat and drawing the borax into a filament with a core of the substance.

4. The process of making filament, which consists in closing the end of a tube with borax under heat, melting a substance in the tube contiguous to said borax, and drawing said borax into a filament with a core of the substance.

5. The process of making filament, which consists in closing the end of a tube with borax under heat, melting a substance in the tube contiguous to said borax, blowing the molten substance into said borax, and drawing said borax into a filament with a core of the substance.

6. The process of making filament, which consists in introducing borax by heat into the end of a tube having an interior restriction at a distance from said end, said borax extending past said restriction, heating a substance in said tube contiguous to said borax, and drawing said borax and substance into a filament having a core of a pure portion of the substance which passes over said restriction.

7. The process of making filament, which consists in introducing borax by heat into the end of a tube having an interior restriction at a distance from said end, said borax extending past said restriction, heating a substance in said tube contiguous to said borax, blowing a pure portion of the substance over said restriction and into the borax, and drawing said borax and pure portion of the substance into a cored filament.

8. The process of enclosing a substance in an envelope, drawing them into a cored filament while heated so that said substance will flow, and solidifying said cored filament close enough to the heated substance so that said substance will flow to the point of solidifying.

9. The process of drawing under heat a filament having an envelope of ductile material and a molten core of less ductile material, and chilling said filament close enough to the source of heat so that the core material will flow to the point of chilling to supply any deficiency of contraction.

10. The process of drawing under heat a filament having an envelope of ductile material and a molten core of less ductile material, and solidifying the core of said filament by passing it as it is drawn through water at a point close enough to the source of heat so that the core material will flow thereto.

11. The combination with means for heating and drawing into a filament a molten substance enclosed in an envelope, of means solidifying the filament at a point to which said molten substance will flow to compensate for contraction.

12. The combination with means for heating and drawing into a filament a molten substance enclosed in an envelope, of means for solidifying the filament at a point to which said molten substance will flow to compensate for contraction, said heating means and solidifying means being in adjustable relation one to the other.

13. The combination with means for heating and drawing into a filament a molten substance enclosed in an envelope, of means for solidifying the filament at a point to which said molten substance will flow to compensate for contraction, said heating means and solidifying means being in adjustable relation one to the other longitudinally of the filament.

14. The combination with means for heating and drawing into a filament a molten substance enclosed in an envelope, of means for solidifying the filament at a point to which said molten substance will flow to compensate for contraction, said solidifying means being adjustable into and out of the path of the filament.

15. The combination with means for heating and drawing into a filament a molten substance enclosed in an envelope, of a chilling device near enough to the heating means for said molten substance to flow thereto, said chilling device presenting to the filament a projecting globule of water and having means for positioning the same so that the filament will pass through it.

16. The combination with means for heating and drawing into a filament a molten substance enclosed in an envelope, of a chilling device near enough to the heating means for said molten substance to flow thereto, said chilling device comprising a body with a cup at its top, means for supplying water to said cup and maintaining a projecting globule thereat, and means for guiding the filament through said globule.

17. The combination with means for heating and drawing into a filament a molten substance enclosed in an envelope, of a chilling device near enough to the heating means for said molten substance to flow thereto, said chilling device comprising a body with a cup at its top, means for supplying water to said cup and maintaining a projecting globule thereat, and a guard mounted on said body for protecting the filament from the heating means.

18. The combination with means for heating and drawing into a filament a molten substance enclosed in an envelope, of a chilling device near enough to the heating means for said molten substance to flow thereto, said chilling device comprising a body with a cup at its top, means for supplying water to said cup and maintaining a projecting globule thereat, and means for moving said chilling device toward and away from the path of the filament.

GEORGE F. TAYLOR.